(12) United States Patent
Smolka et al.

(10) Patent No.: US 12,282,176 B2
(45) Date of Patent: Apr. 22, 2025

(54) OBJECTIVE

(71) Applicant: Nextlens Switzerland AG, Dietikon (CH)

(72) Inventors: Stephan Smolka, Dietikon (CH); Frank Bose, Buonas (CH); Manuel Aschwanden, Allenwinden (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 410 days.

(21) Appl. No.: 17/819,321

(22) Filed: Aug. 12, 2022

(65) Prior Publication Data
US 2023/0046355 A1   Feb. 16, 2023

(30) Foreign Application Priority Data

Aug. 12, 2021 (DE) .................. 10 2021 121 001.1
Oct. 13, 2021 (WO) ................ PCT/IB2021/059403

(51) Int. Cl.
*G02B 3/12* (2006.01)
(52) U.S. Cl.
CPC .................................. *G02B 3/12* (2013.01)
(58) Field of Classification Search
CPC .......... G02B 3/12; G02B 27/646; G02B 3/14; G02B 7/021; G02B 13/0075; G02B 7/022; G02B 7/005; G02B 15/22
See application file for complete search history.

(56) References Cited

U.S. PATENT DOCUMENTS

| 9,841,539 | B2 | 12/2017 | Aschwanden |
| 2010/0232161 | A1 | 9/2010 | Aschwanden |
| 2019/0033615 | A1 | 1/2019 | Kawamura |
| 2019/0104239 | A1 | 4/2019 | Aschwanden |

(Continued)

FOREIGN PATENT DOCUMENTS

| CN | 101078858 | 11/2007 |
| CN | 107533213 | 1/2018 |
| CN | 107664897 | 2/2018 |

(Continued)

*Primary Examiner* — James C. Jones
(74) *Attorney, Agent, or Firm* — JMB Davis Ben-David

(57) ABSTRACT

Objective comprising a lens barrel, an actuator and a tunable lens, wherein the tunable lens comprises a primary membrane and a secondary membrane delimiting a liquid volume on opposing sides along an axial direction, the tunable lens comprises a container delimiting the liquid volume in lateral directions, wherein the lateral directions extend perpendicularly with respect to the axial direction, and the primary membrane and the secondary membrane are attached to opposing sides of the container, the tunable lens comprises a window member which is attached to the secondary membrane, wherein the secondary membrane connects the window member and the container elastically, wherein relative motion of the window member and the container along the axial direction results in a change of an optical property of the tunable lens, the window member or the container is fixedly attached to the lens barrel, the actuator is arranged to provide an actuation force along the axial direction, wherein the actuation force acts between the tunable lens and the lens barrel, and the actuation force results in a relative motion of the window member with respect to the container.

12 Claims, 10 Drawing Sheets

(56) References Cited

U.S. PATENT DOCUMENTS

2020/0096770 A1\* 3/2020 Pedder ............... G02B 27/0172
2021/0080621 A1 3/2021 Lee

FOREIGN PATENT DOCUMENTS

| CN | 109981932 | 7/2019 |
| JP | 5446740 | 3/2014 |
| KR | 20180123376 | 11/2018 |
| KR | 20200144552 | 12/2020 |
| TW | 201238338 | 9/2012 |
| WO | 2008076399 | 6/2008 |
| WO | 2021121681 | 6/2021 |

\* cited by examiner

OBJECTIVE

CROSS-REFERENCE TO RELATED APPLICATIONS

This application claims priority to German patent application No. 10 2021 121 001.1, filed on Aug. 12, 2021, and International Patent Application No. PCT/IB2021/059403, filed on Oct. 13, 2021, the contents of which are incorporated by reference herein in their entirety.

FIELD

The present disclosure concerns an objective. The objective is an imaging system which is arranged to image objects in an object plane into an image plane. The objective may be arranged to capture pictures or videos of the object plane.

BACKGROUND

The present objective is based on the following considerations. The imaging quality of an objective highly depends on the alignment of the refractive components with respect to each other. In objectives which solely comprise rigid optical components, these are aligned by arranging the rigid optical components in a common lens barrel. However, actuators to interface tunable optical components require additional space, wherefore tunable optical components must be arranged outside of the lens barrel.

The present objective makes use of the idea of attaching the tunable lens to the lens barrel and incorporating the lens barrel in the actuation of the tunable lens.

Advantageously, the attachment of the tunable lens to the lens barrel results in a particularly good alignment and the incorporation enables a particularly compact geometry of the objective.

SUMMARY

The objective comprises a lens barrel, an actuator and a tunable lens. The lens barrel is arranged to carry and align optical elements, like lenses, prisms, filters or apertures. The tunable lens is a refractive optical component, wherein an optical property is adjustable. In particular, the optical property is at least one of the optical power, astigmatism, coma or prism. The actuator is arranged to interface the tunable lens, wherein the actuator is arranged to control the optical property of the tunable lens.

The tunable lens comprises a primary membrane and a secondary membrane delimiting a liquid volume on opposing sides along an axial direction. In particular, the primary membrane and the secondary membrane comprise optical surfaces of the tunable optical component. For example, the primary and the secondary membrane are transparent. Moreover, the primary and the secondary membrane are flexible and the shape of at least one of the membranes is altered when adjusting the optical property of the tunable lens. The axial direction may correspond to the optical axis of the tunable lens. The liquid volume is filled with a transparent, preferably incompressible fluid.

The tunable lens comprises a container delimiting the liquid volume in lateral directions, wherein the lateral directions extend perpendicularly with respect to the axial direction. The container may have the shape of a ring. The liquid volume may be arranged within the ring. The container surrounds the liquid completely in lateral directions. In particular the container comprises a rigid material. For example, the container comprises a sheet metal, polymer, silicon or ceramic. In particular, the container comprises a printed circuit board.

The primary membrane and the secondary membrane are attached to opposing sides of the container. In particular, the opposing sides of the container to which the primary membrane and the secondary membrane are attached are planar. Preferably the opposing sides of the container extend parallel with respect to each other. The primary and the secondary membrane delimit the liquid volume along the axial direction. In particular, the primary membrane, the secondary membrane and the container seal the liquid volume in a liquid tight manner.

The tunable lens comprises a window member, which is attached to the secondary membrane, wherein the secondary membrane connects the window member and the container elastically. The window member may be transparent and rigid. In particular, the window member is planar on a side facing the secondary membrane. The window member may comprise a curved, in particular convexly or concavely curved optical surface. For example, the window member acts as a rigid lens of the objective. The window member and the secondary membrane are connected extensively. In particular, the window member stiffens the membrane in a region where the window member is connected to the membrane. In lateral directions the window member is surrounded by a portion of the secondary membrane which is not covered by the window element. The said portion of the secondary membrane suspends the window member elastically on the container. In particular, seen in a top view along the axial direction, the container surrounds the window member laterally. For example, as seen in a top view an outer diameter of window member is smaller than inner diameter of container.

Relative motion of the window member and the container in the axial direction results in a change of an optical property of the tunable lens. The optical property may be at least one of the optical power, prism, astigmatism angle, astigmatism power or coma.

Either the window member or the container is fixedly attached to the lens barrel. In particular, the optical axis of the tunable lens is aligned with an optical axis of the lens barrel. In particular the optical axes of the lens barrel and the tunable lens coincide.

The actuator is arranged to provide an actuation force along the axial direction, wherein the actuation force results in a relative motion of the window member with respect to the container. The actuation force may act symmetrically with respect to the optical axis of the tunable lens. In particular, a symmetric actuation force results in a change of the optical power of the tunable lens. Alternatively, the actuation force may act asymmetrically, which results in a tilt of the window member with respect to the container, which alters the prism of the tunable lens.

According to one embodiment, the objective comprises a lens barrel, an actuator and a tunable lens. The tunable lens comprises a primary membrane and a secondary membrane delimiting a liquid volume on opposing sides along an axial direction. The tunable lens comprises a container delimiting the liquid volume in lateral directions, wherein the lateral directions extend perpendicularly with respect to the axial direction, and the primary membrane and the secondary membrane are attached to opposing sides of the container. The tunable lens comprises a window member which is attached to the secondary membrane, wherein the secondary membrane connects the window member and the container elastically. Relative motion of the window member and the container along the axial direction results in a change of an optical property of the tunable lens. The window member or the container is fixedly attached to the lens barrel. The actuator is arranged to provide an actuation force along the axial direction, wherein the actuation force acts between the tunable lens and the lens barrel. The actuation force results in a relative motion of the window member with respect to the container.

According to one embodiment the lens barrel has a cylindrical shape, and the lens barrel has a recess extending completely through the lens barrel from a first face to a second face, wherein at least one static refractive component is arranged in the recess of the lens barrel, and the tunable lens is fixedly attached to the first face. In particular, the optical axis of tunable lens is aligned congruently with an optical axis of the static refractive component. In particular, the tunable lens comprises an aperture of the objective. Preferably, the container forms the aperture of the objective.

The actuator may be arranged on a side of the tunable lens facing the lens barrel. In particular, the actuator or some parts of the actuator completely surround the lens barrel in a plane along lateral directions. Preferably, the actuator does not protrude beyond the tunable lens on a side facing away from the lens barrel. The tunable lens is directly attached to the lens barrel on a side facing the lens barrel. In particular, a total distance measured along the axial direction from the second face to a side of the tunable lens facing away from the lens barrel corresponds to the sum of a distance between the first face and the second face and a distance between opposed sides of the tunable lens. In particular, the actuator does not contribute to the total distance and the actuator does neither protrude beyond the second face nor beyond a side of the tunable lens facing away from the lens barrel.

According to one embodiment, the objective comprises a mounting unit and a substrate, wherein the lens barrel is attached to the substrate by means of the mounting unit. A lateral surface of the lens barrel comprises an outside thread and the mounting unit comprises an inside thread, wherein the outside thread is complementary to the inside thread. The mounting unit may comprise electrically conductive structures which are arranged to electrically connect the actuator. In particular, the mounting unit is fixedly attached to the substrate. The substrate may comprise a printed circuit board (PCB). The PCB may be arranged to electrically connect the conductive structures to a driver. In particular, the outside thread and the inside thread may comprise complementary conductive portions, which provide electrical connection between the mounting unit and the lens barrel.

According to one embodiment, the actuator is a voice-coil actuator comprising a magnet and a coil, wherein the coil is fixedly attached to the lens barrel and the magnet is fixedly attached to the tunable lens. The coil may be attached to the first face. Alternatively, the coil may be wound around the lens barrel. In particular, the coil is part of a printed circuit board. For example, the coil is integrally formed with the printed circuit board and the coil comprises conductive tracks of the printed circuit board.

According to one embodiment the magnet is ring-shaped as seen in a top view along the axial direction, the coil extends along an inner edge and/or along an outer edge of the magnet as seen in a top view. The magnet is magnetized along the axial direction. Thus, the coil is arranged in a region where the magnetic field vectors of the magnetic field extend at least partially in a lateral direction. The lateral portion of the magnetic field vector contributes to the Lorenz-Force along the axial direction. The ring-shaped magnet extends around an opening, wherein the inner edge faces the opening and the outer edge faces away from the opening. In case the coil extends along the inner edge, the coil has essentially the same contour as the inner edge as seen in a top view. In case the coil extends along the outer edge, the coil has essentially the same contour as the outer edge as seen in a top view. In particular, the coil is congruent with the inner edge or the outer edge.

According to one embodiment the magnet has a chamfered shape, so that a thickness of the magnet at the inner edge is larger than a thickness at the outer edge measured along the axial direction. In particular, when a main extension plane of the magnet is arranged parallel to the first face or parallel to a main extension plane of the coil, a distance from the outer edge to the coil or to the first face is larger than a distance from the inner edge to the coil or to the first face. Advantageously, the chamfered shape of the magnet increases the range of motion of the magnet with respect to the coil, when tilting the magnet with respect to the coil.

According to one embodiment, the coil comprises at least three coil portions, each coil portion comprises a first section and a second section. The first section extends along the inner edge of the magnet respectively and/or the second section extends along the outer edge of the magnet respectively. As seen in a top view, the first section overlaps with a part of the inner edge and the second section overlaps with a part of the outer edge. For example, the coil portions have a kidney shape as seen in a top view. The coil portions are distributed along the perimeter of the ring-shaped magnet, and a current through the coil portions is individually controllable. Depending on the direction of the current and the current intensity, the magnet is attracted to the coil portion or repelled from the coil portion by Lorenz-Force. In particular, the direction of the current in the first section is opposed to the direction of the current in the second section in each coil portion.

For example, the coil portions are attracted or repelled evenly when the current in the coil portions has the same direction and the same current intensity. Such evenly distributed current results in a translation of the coil with respect to the magnet along the axial direction, which causes a change of the optical power of the tunable lens.

By individually controlling the current intensity and the current direction in the coil portions, the attraction and the repulsion between the coil portions and the magnet may be controlled individually. An uneven distribution of the attraction and the repulsion of the coil portions results in a tilt of the magnet with respect to the coil. Such tilt enables to alter the prism of the tunable lens, which is particularly useful for optical image stabilization.

According to one embodiment the actuator comprises a piezo element, wherein the piezo element is attached to the lens barrel and the tunable lens. The piezo element may be coupled to the first face and to the container or to the window member. The piezo element is arranged to alter a tuning state of the tunable lens. In particular, the piezo element comprises multiple segments which are arranged along the circumference of the tunable lens, wherein the segments are individually controllable. By individually controlling the piezo elements, the window member or the container may be tilted with respect to the lens barrel.

According to one embodiment, the actuator comprises a SMA element, wherein the SMA element is attached to the tunable lens and to the mounting unit and/or the lens barrel. In particular, the SMA element comprises multiple wires comprising a shape memory alloy material. At the tunable lens, the wires may be coupled to the window element or to the container. The wires may be attached to the mounting unit and/or to the lens barrel. For actuation, a current is applied to the wires, whereby the shape of the wires is altered. The change in the shape of the wires results in a force, which is utilized to control the tuning state of the tunable lens.

According to one embodiment, the SMA element comprises first SMA sections for generating a force in a first direction and second SMA sections for generating a force in a second direction, wherein the first direction and the second direction are opposed with respect to each other along the axial direction. In particular, the first SMA sections are arranged to move the container or the window element away from the lens barrel and the second SMA sections are arranged to move the container or the window towards the lens barrel. The first SMA sections and the second SMA sections are distributed evenly along the circumference of the tunable lens. In particular, the first sections and the second sections are individually controllable.

According to one embodiment the actuator is electrically connected to the substrate by means of bonded wires, wherein the bonded wires are connected to the lens barrel, the mounting unit and/or the substrate. In particular, the lens barrel and/or the mounting unit may comprise a bond pad, which provides an area for attaching the bonded wires. In particular, the bond pad may be embedded in electrically insulating material. Thus, the bond pad merely provides a mechanical mount for the bonded wire. In particular, during intended operation, no current flows through the bon pad.

According to one embodiment, the actuator is electrically connected to the substrate by means of a molded conductive structure which is integrally formed with the mounting unit and/or the lens barrel. The molded conductive structure may be built integrally with the outer thread and the inner thread. Thus, the interlocking connection between the outer thread of the lens barrel and the inner thread of the mounting unit provides electrical connection for the actuator.

BRIEF DESCRIPTION OF THE DRAWINGS

Further advantages and advantageous embodiments and further embodiments of the objective result from the following embodiment examples shown in connection with the figures.

It is shown in

Elements that are the same, similar or have the same effect are given the same reference signs in the figures. The figures and the size ratios of the elements shown in the figures to one another are not to be regarded as to scale. Rather, individual elements may be shown exaggeratedly large for better representability and/or for better comprehensibility.

DETAILED DESCRIPTION

Figure 1:
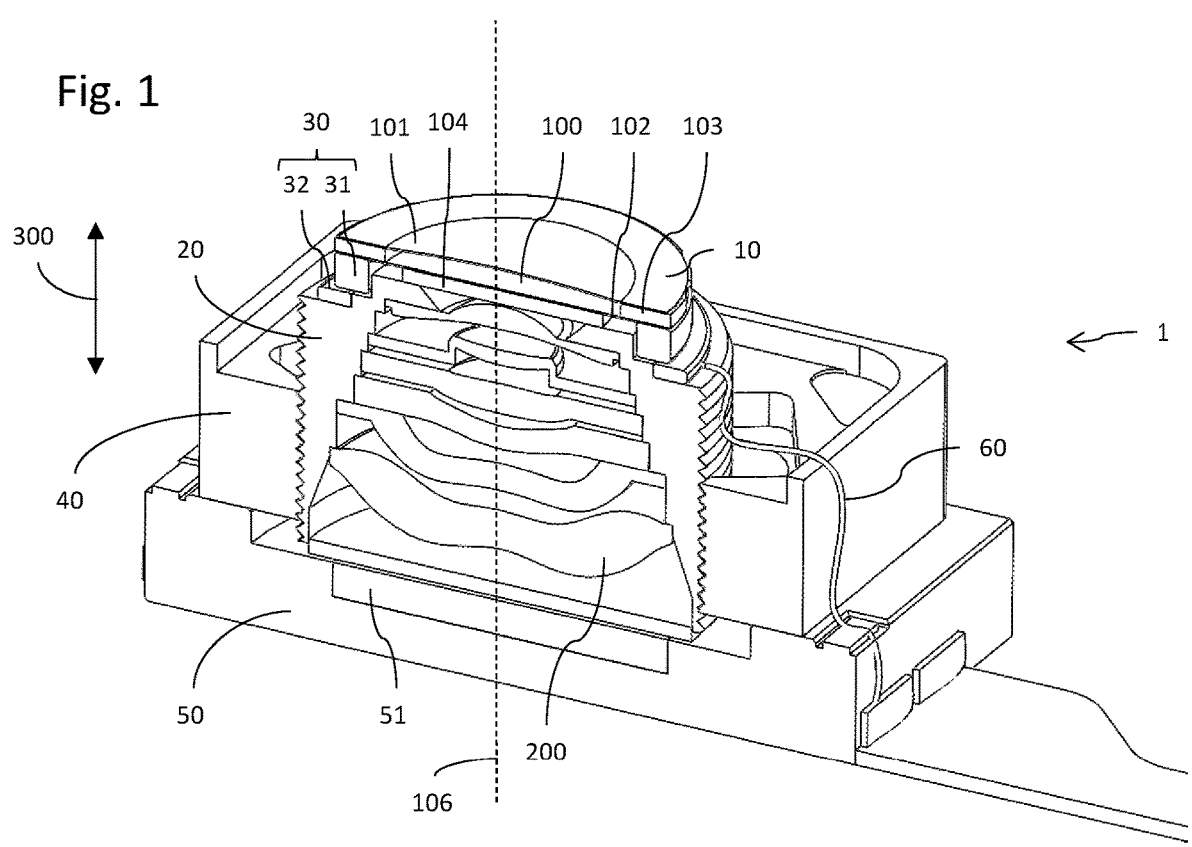
FIGS. 1, 2, 3, 4, 5, 6, 7, 9 and 11 show an exemplary embodiment of an objective in a schematic sectional view.

FIG. 1 shows an exemplary embodiment of an objective 1 in a schematic sectional view. The objective 1 comprises a lens barrel 20, an actuator 30 and a tunable lens 10, wherein the tunable lens 10 comprises a primary membrane 101 and a secondary membrane 102 delimiting a liquid volume 100 on opposing sides along an axial direction. The axial direction extends along the optical axis 106.

The tunable lens 10 comprises a container 103 delimiting the liquid volume 100 in lateral directions, wherein the lateral directions extend perpendicularly with respect to the axial direction, and the primary membrane 101 and the secondary membrane 102 are attached to opposing sides of the container 103.

The tunable lens 10 comprises a window member 104 which is attached to the secondary membrane 102, wherein the secondary membrane 102 connects the window member 104 and the container 103 elastically. The secondary membrane 102 protrudes laterally over the window member 104. The window member 104 is attached to the lens barrel 20. Relative motion of the window member 104 and the container 103 along the axial direction results in a change of an optical property of the tunable lens 10. Either the window member 104 or the container 103 is fixedly attached to the lens barrel 20.

The actuator 30 is arranged to provide an actuation force 300 along the axial direction, wherein the actuation force 300 acts between the tunable lens 10 and the lens barrel 20. The actuation force 300 results in a relative motion of the window member 104 with respect to the container 103. The actuator 30 is a voice-coil actuator comprising a magnet 31 and a coil 32, wherein the coil 32 is fixedly attached to the lens barrel 20 and the magnet 31 is fixedly attached to the tunable lens 10. The actuations force 300 is a Lorenz-Force.

The lens barrel 20 has a cylindrical shape and a recess extending completely through the lens barrel 20 from a first face 21 to a second face 22. At least one static refractive component 200 is arranged in the recess of the lens barrel 20, and the tunable lens 10 is fixedly attached to the first face 21. In particular, the window member 104 is fixedly attached to the lens barrel 20 and the container 103 is attached to the magnet 31. The actuation force 300 moves the container with respect to the lens barrel 20.

The objective comprises a mounting unit 40 and a substrate 50, wherein the lens barrel 20 is attached to the substrate 50 by means of the mounting unit 40. The mounting unit 40 is arranged to align the lens barrel 20 with respect to the substrate 50. The substrate comprises an image sensor 51. The image sensor 51 is arranged in the image plane of the objective and the image sensor is arranged to capture an image of the object plane. A lateral surface of the lens barrel 20 comprises an outside thread and the mounting unit 40 comprises an inside thread, wherein the outside thread is complementary to the inside thread. The actuator 30 is electrically connected to the substrate 50 by means of a bonded wire 60, wherein the bonded wire 60 are connected to the substrate 50.

Figure 2:
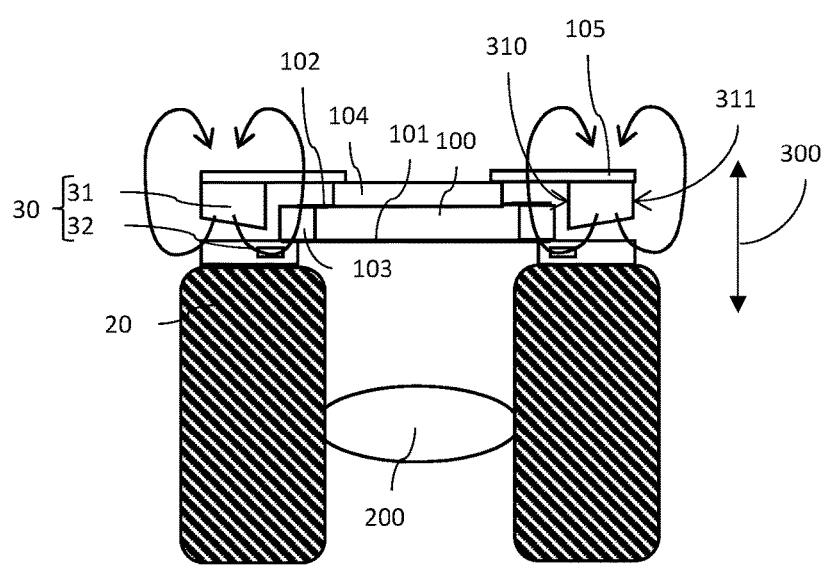

FIG. 2 shows an exemplary embodiment of an objective 1 in a schematic sectional view. The container 103 is fixedly attached to the lens barrel 20 by means of the coil 32. The coil comprises a PCB with an insulating body and conductive tracks, which extend circumferentially around the optical axis. The window member 104 is suspended by means of the secondary membrane 102. The actuation force 300 moves the window element with respect to the lens barrel 20. The objective 1 comprises a voice coil actuator with a single coil 32 extending along an inner edge 310 of the magnet 310. The magnet 31 is fixedly attached to the window member 104 by means of an aperture 105.

The magnet 31 has a chamfered shape, so that a thickness of the magnet 31 at the inner edge 310 is larger than a thickness at an outer edge 311 measured along the axial direction. Advantageously the chamfered magnet 31 increases a range of motion of the magnet 31 with respect to the coil 32, in particular when the magnet 31 is tilted with respect to the coil 32.

Figure 3:
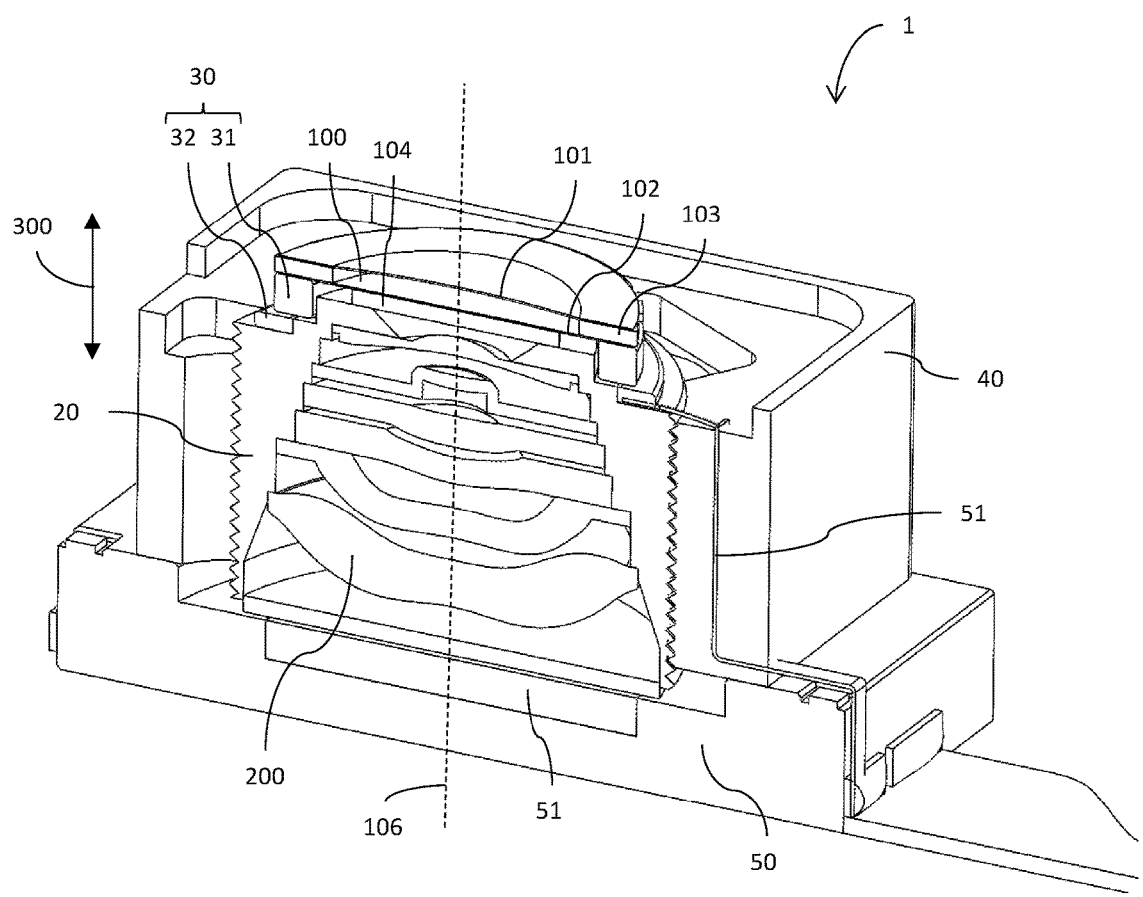

FIG. 3 shows an exemplary embodiment of an objective 1 in a schematic sectional view. The actuator is a voice coil actuator comprising a magnet 31 and a coil 32. The actuator is arranged to the move the container 103, wherein the window member 104 is fixedly attached to the lens barrel. The actuator 30 is electrically connected to the substrate 50 by means of a molded conductive structure 51 which is integrally formed with the mounting unit 40. In particular, the molded conductive structure may be integrally formed with the lens barrel 20. In particular, the molded conductive structure may form adjacent parts of the inner thread and the outer thread.

Figure 4:
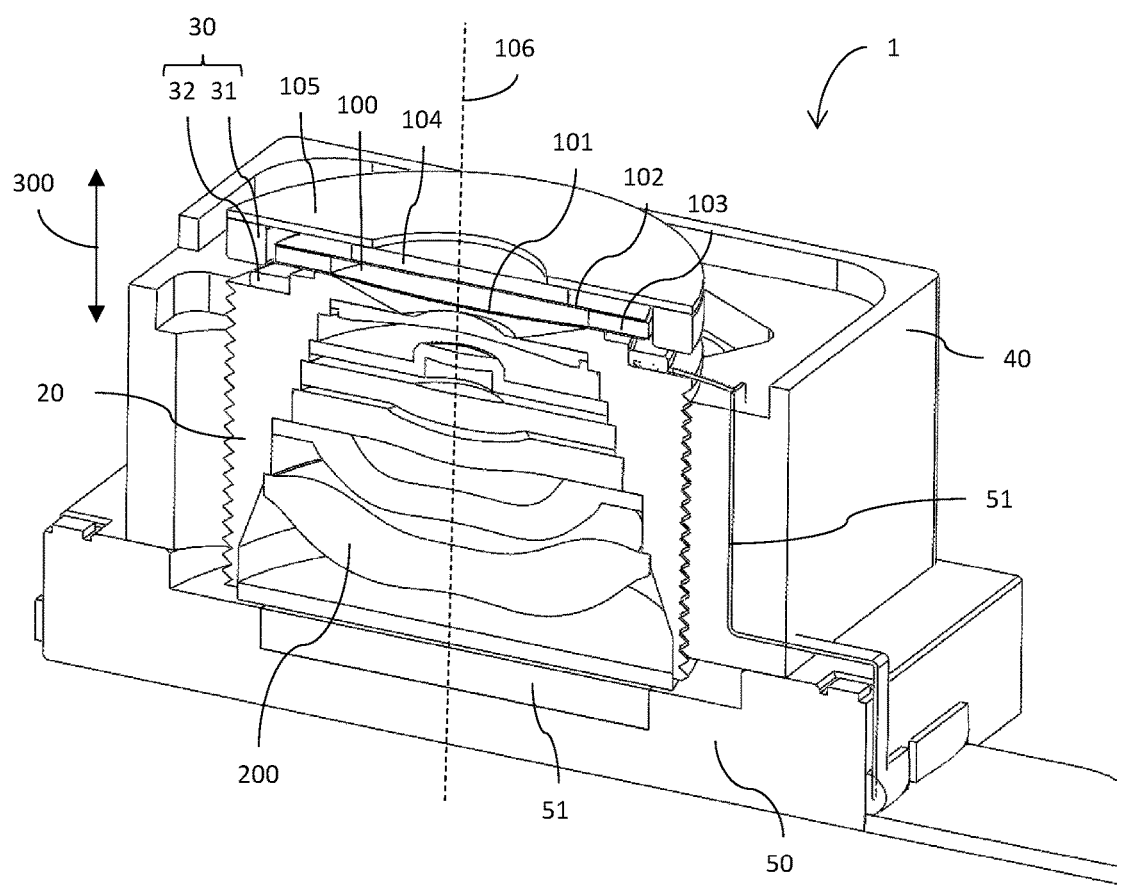

FIG. 4 shows an exemplary embodiment of an objective 1 in a schematic sectional view. The embodiment in FIG. 4 differs from the embodiment shown in FIG. 3 in that the container 103 is fixedly attached to the lens barrel 20 and the actuator 30 is arranged to move the window member 104 with respect to the lens barrel 20. An aperture 105 connects the magnet 31 to the window member 104. In particular, the aperture 105 determines the depth of field of the objective.

Figure 5:
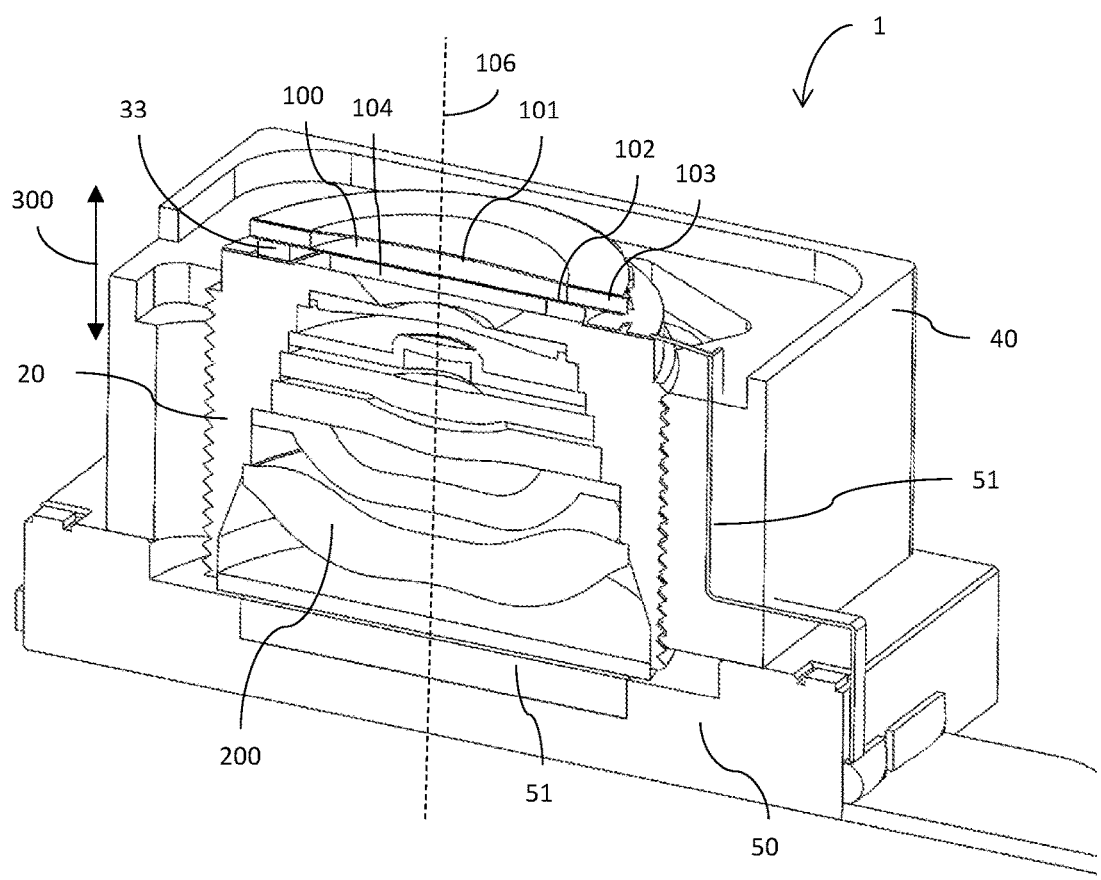

FIG. 5 shows an exemplary embodiment of an objective 1 in a schematic sectional view. The actuator 30 comprises a piezo element 33, wherein the piezo element 33 is attached to the lens barrel 20 and the tunable lens 10. In particular, the piezo element 33 is arranged to move the container 103 with respect to the lens barrel along the optical axis 106. The window member 104 is fixedly attached to the lens barrel 20. A molded conductive structure 51 provides an electrical connection between the substrate 50 and the piezo element 33. The molded conductive structure is embedded in the mounting unit 40.

Figure 6:
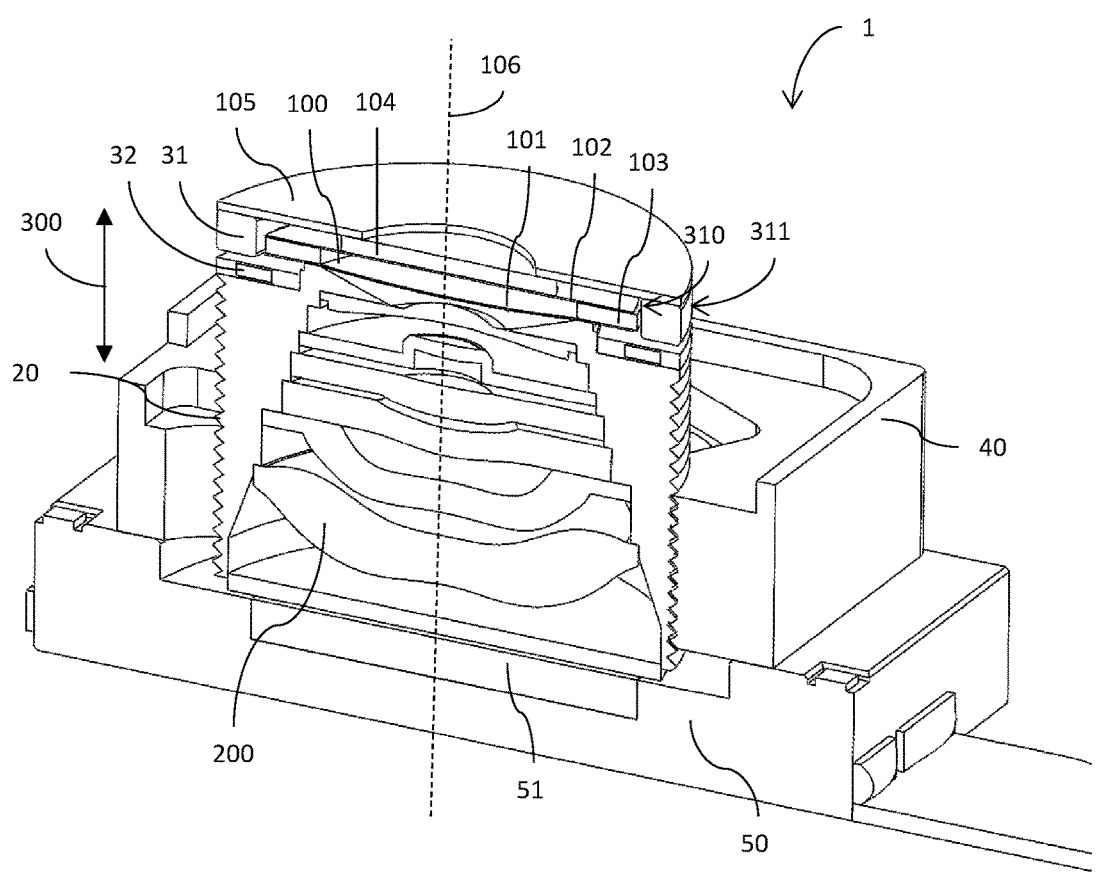

FIG. 6 shows an exemplary embodiment of an objective 1 in a schematic sectional view. The embodiment shown in FIG. 6 differs from the embodiment shown in FIG. 3 in that the coil 32 comprises a PCB, wherein conductive tracks are embedded in an insulating structure. Wherein the conductive tracks and the insulating structures are arranged in layers. The magnet 31 is ring-shaped as seen in a top view along the optical axis 106, the coil 32 extends along an inner edge 310 of the magnet 31 as seen in a top view.

Figure 7:
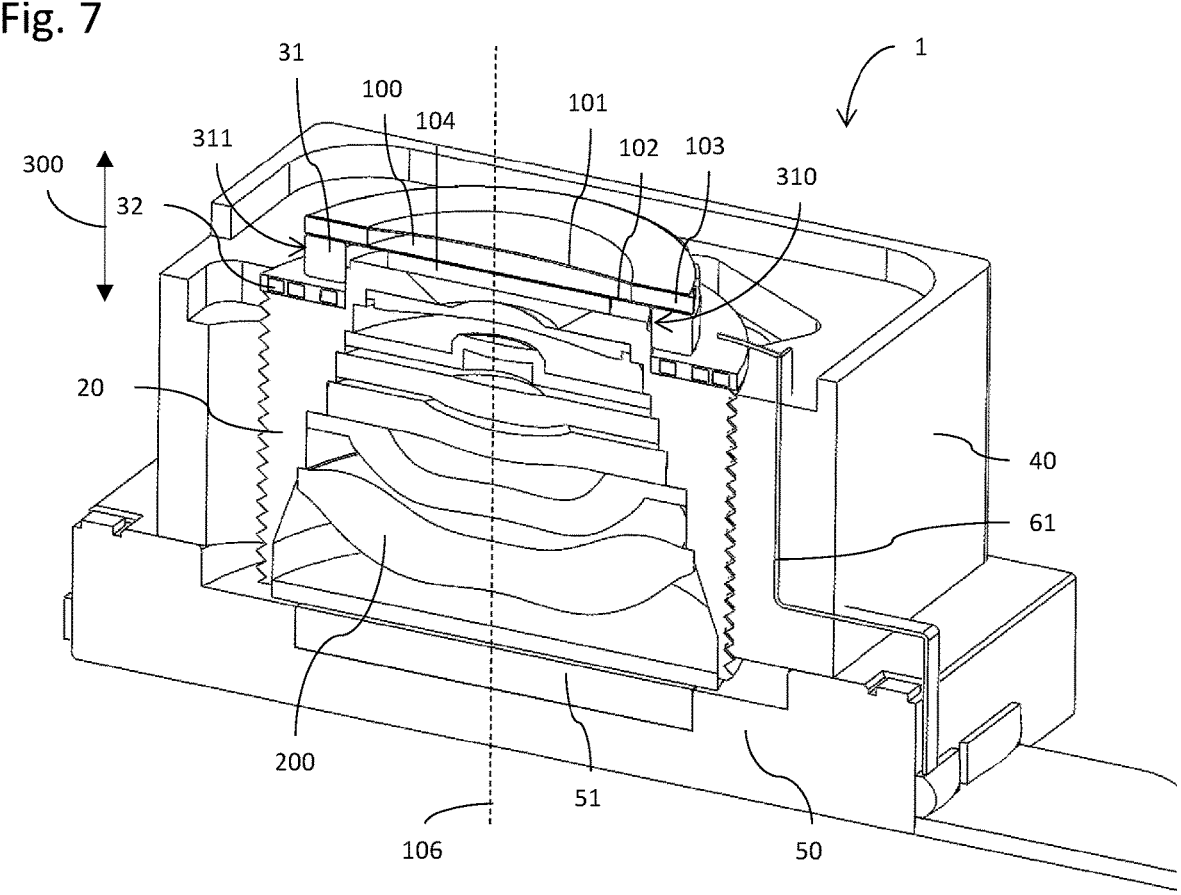
Figure 8:
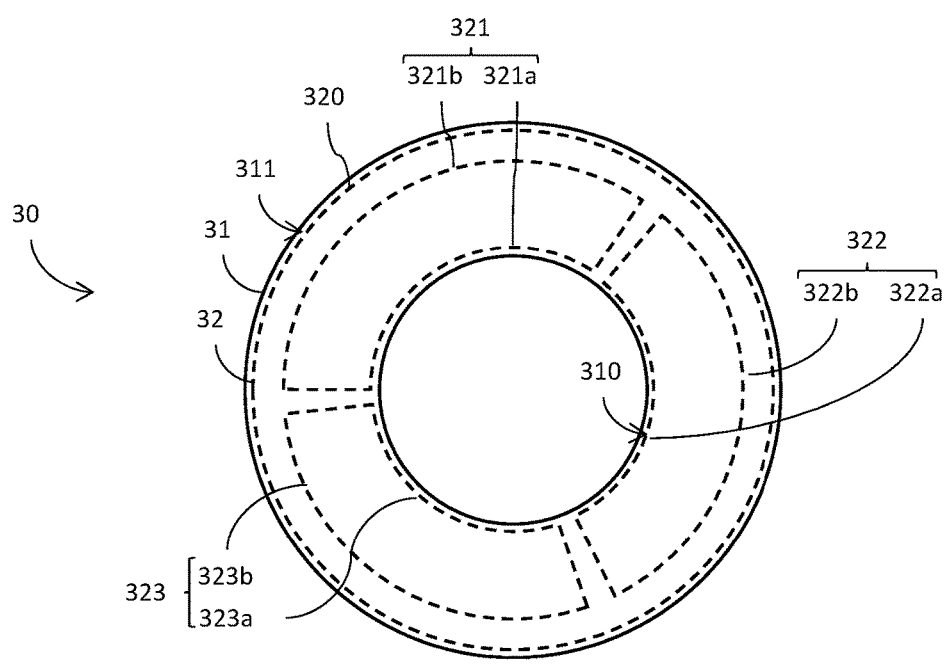
FIGS. 8 and 10 show an exemplary embodiment of an actuator of an objective in a schematic top view.

FIG. 7 shows an exemplary embodiment of an objective 1 in a schematic sectional view and FIG. 8 shows the actuator 30 of the corresponding embodiment in a top view along the optical axis 106. The coil 32 comprises four coil portions 320, 321, 322, 323. One coil portion 320 of the four coil portions 320, 321, 322, 323 extends along the outer edge 311 around the other three coil portions 321, 322, 323. The three coil portions 321, 322, 323 comprise a first section 321a, 322a, 323a and a second section 321b, 322b, 323b respectively. The first section 321a, 322a, 323a extends along the inner edge 310 of the magnet 31 respectively. The three coil portions 321, 322, 323 are distributed along the perimeter of the ring-shaped magnet 31. In particular, each first section 321a, 322a, 323a extends at least along a 90° angle of the perimeter of the inner edge. In particular, each of the coil portions extends along an equal angle of the parameter of the inner edge 310. A current through the coil portions 320, 321, 322, 323 is individually controllable. A current in the coil portion 320 extending along the outer edge 311 results in a translation of the coil 32 along the optical axis 106 with respect to the magnet 31, which results in a change of the optical power of the tunable lens 10. An uneven current in the three coils 321, 322, 323 results in a tilting motion of the coil 32 with respect to the magnet 31. The axis of rotation of the tilting motion extends perpendicularly with respect to the optical axis 106. The tilting motion results in change of the prism of the tunable lens 10. In particular, the tilting motion may be controlled to perform optical image stabilization for images captured by means of the objective.

Alternatively, the coil portion 320 may extend along the inner edge 310 of the magnet and the three coil portions 321, 322, 323 may be arranged around the coil portion 320. According to this alternative, the second sections 321b, 322b, 323b extend along the outer edge 311 of the magnet.

Figure 9:
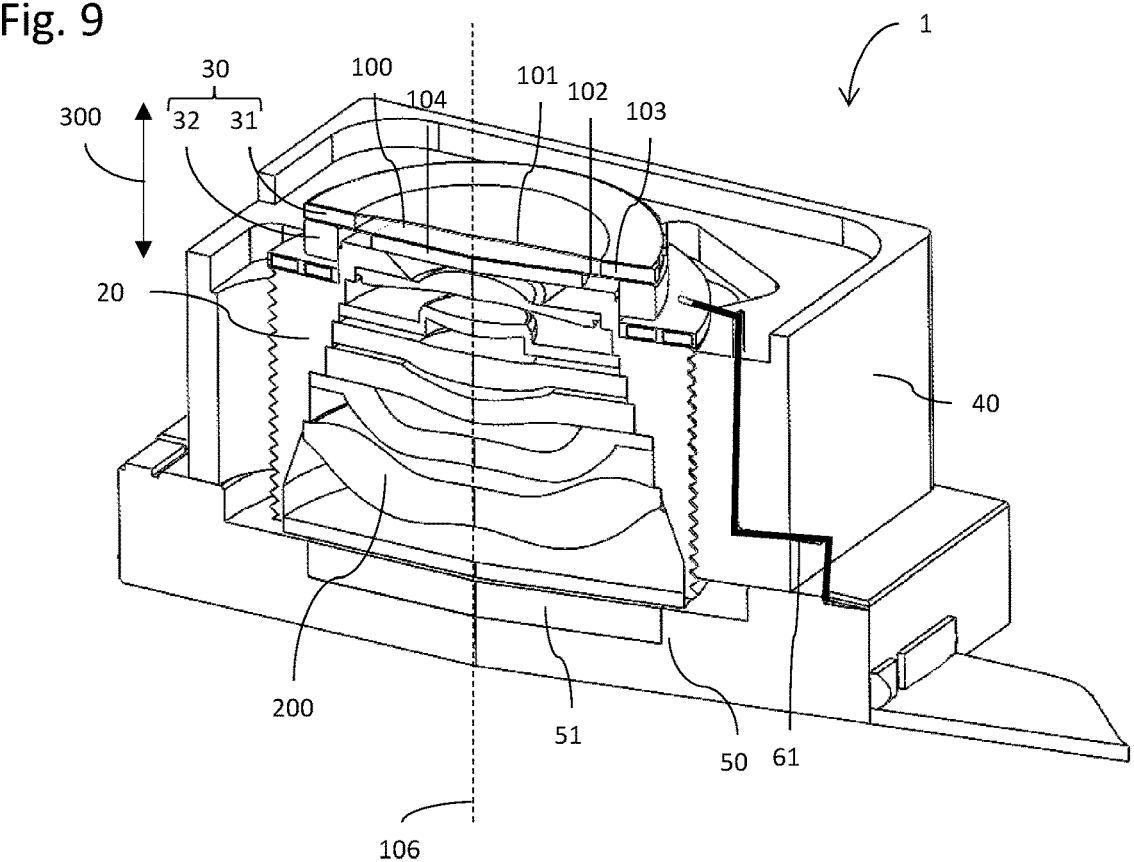
Figure 10:
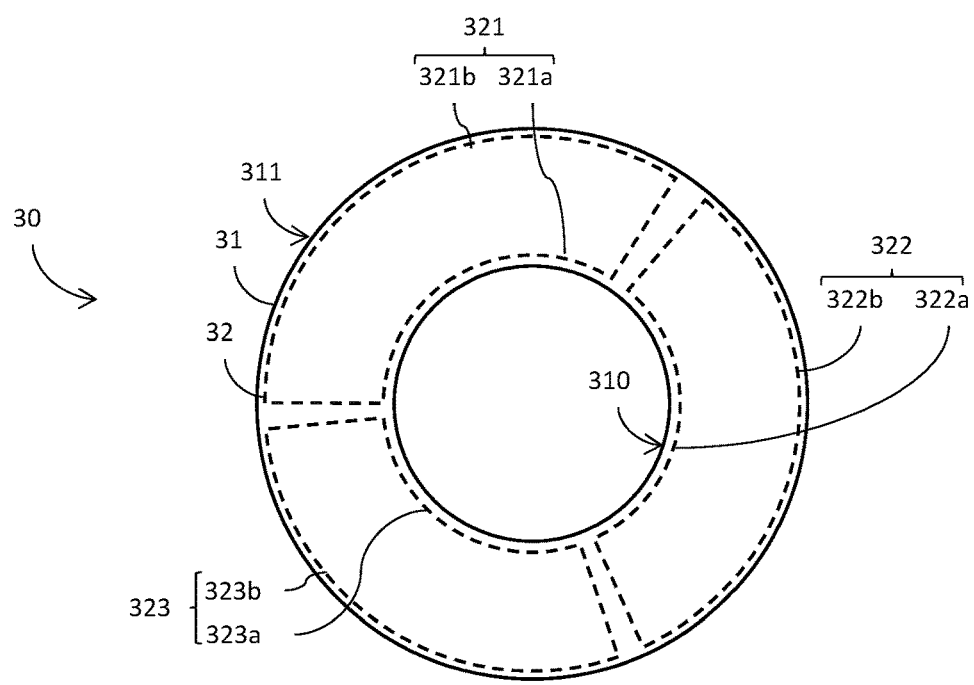

FIG. 9 shows an exemplary embodiment of an objective 1 in a schematic sectional view and FIG. 10 shows the actuator 30 of the corresponding embodiment in a top view along the optical axis 106. The embodiment of FIG. 7 differs from the embodiment shown in FIG. 9 in the arrangement of the coil portions 321. 322. 323. The coil portions 321, 322, 323 each comprise a first section 321a, 322a, 323a and a second section 321b, 322b, 323b, wherein the first section extends along the inner edge 310 and the second section extends along the outer edge 311. The coil portions 321, 322, 323 extend along even portions of the circumference of the magnet. An even current in the coil portions 321, 322, 323 results in a translation of the coil 32 with respect to the magnet 31 along the optical axis 106. An uneven current distribution in the coil portions results in a tilting motion of the coil 32 with respect to the magnet 31. The current in the first sections 321a, 322a, 323a flows opposed to the current in the second sections 321b, 322b, 323b respectively. The magnetic field is arranged such that the current in two sections of the same portion acts in a same direction. For example, both sections of a coil portion are repelled or both sections of a coil portion are attracted by the magnet.

Figure 11:
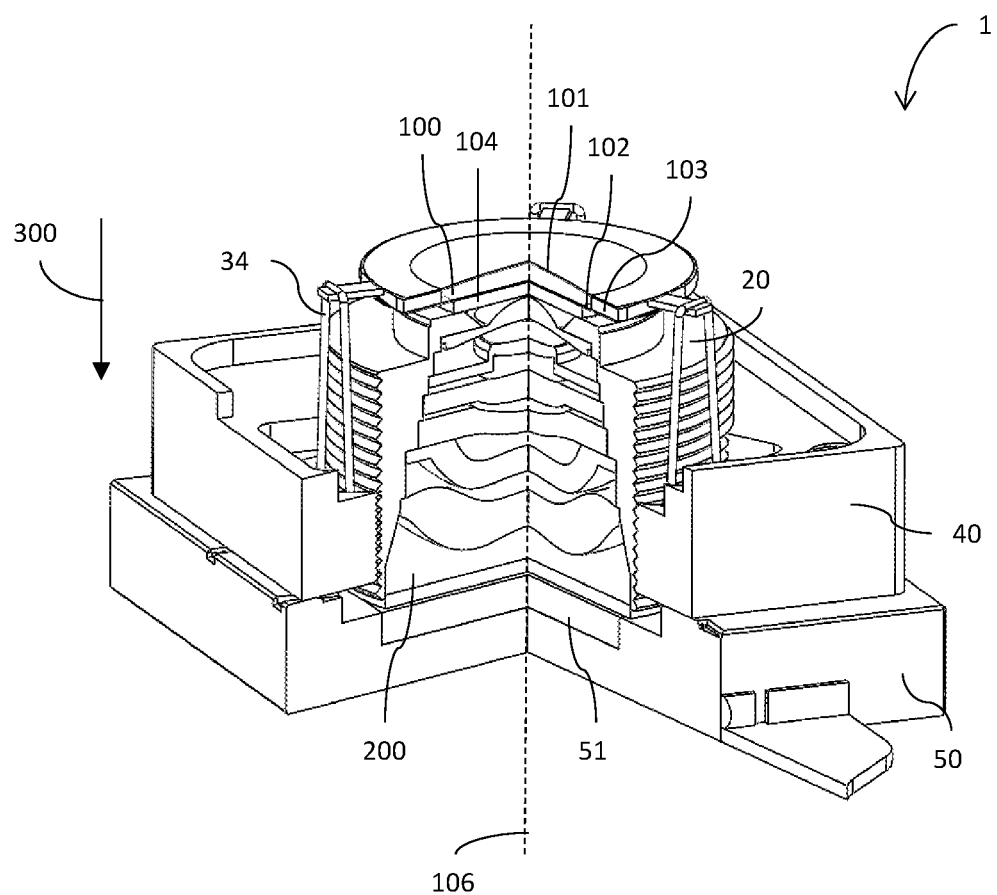

FIG. 11 shows an exemplary embodiment of an objective 1 in a schematic sectional view. The actuator 30 comprises a SMA element 34, wherein the SMA element 34 is attached to the tunable lens 10 and to the mounting unit 40 and/or the substrate 50. The SMA element is arranged to pull the container along the optical axis 106 towards the substrate 50. The SMA element comprises multiple wires, wherein the wires are attached equidistant along the perimeter of the tunable lens 10. The wires may be controlled individually. Thus, a tilt of the container 103 with respect to the window member 104 may be controlled by means of the wires. In particular, the elastic properties of the secondary membrane provide a retaining force, which returns the tunable lens 10 in its original state.

Figure 12:
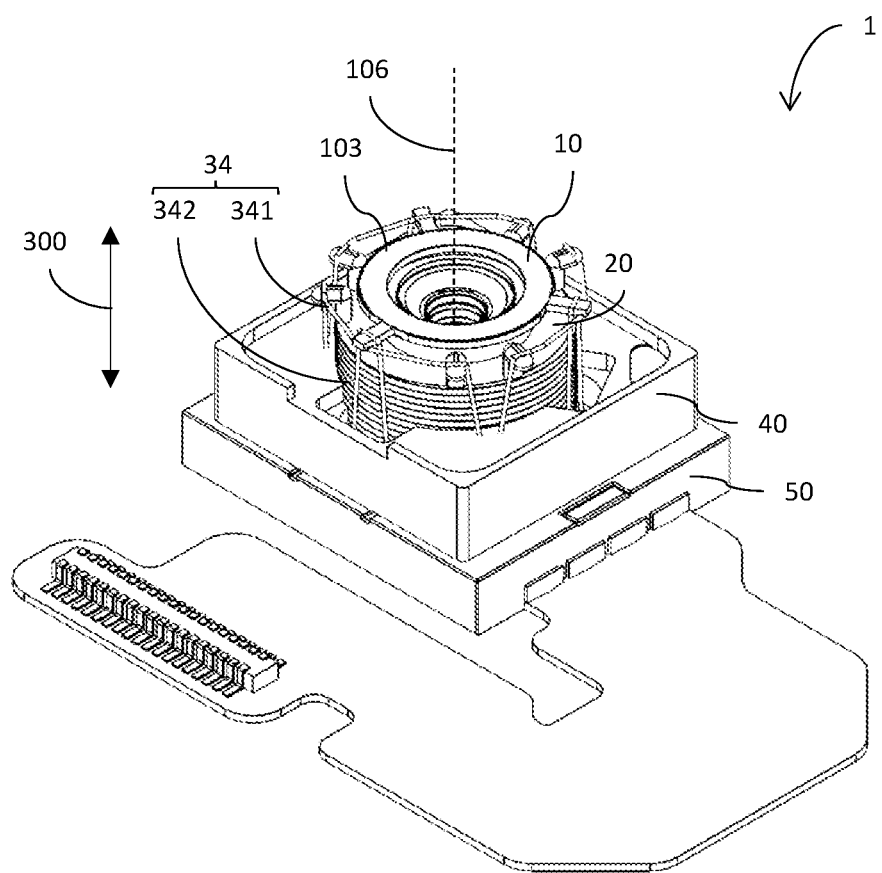
FIG. 12 shows an exemplary embodiment of an objective in a schematic perspective view.

FIG. 12 shows an exemplary embodiment of an objective 1 in a schematic sectional view. The embodiment shown in FIG. 12 differs from the embodiment shown in FIG. 11 in that the SMA element 34 comprises first SMA sections 341 generating a force in a first direction and second SMA sections 342 generating a force in a second direction, wherein the first direction and the second direction are opposed with respect to each other along the axial direction. The SMA element is arranged to move the container away from the substrate 50 and towards the substrate 50. Advantageously, a larger tuning range is provided by having first SMA sections 341 and second SMA sections 342.

Figure 13:
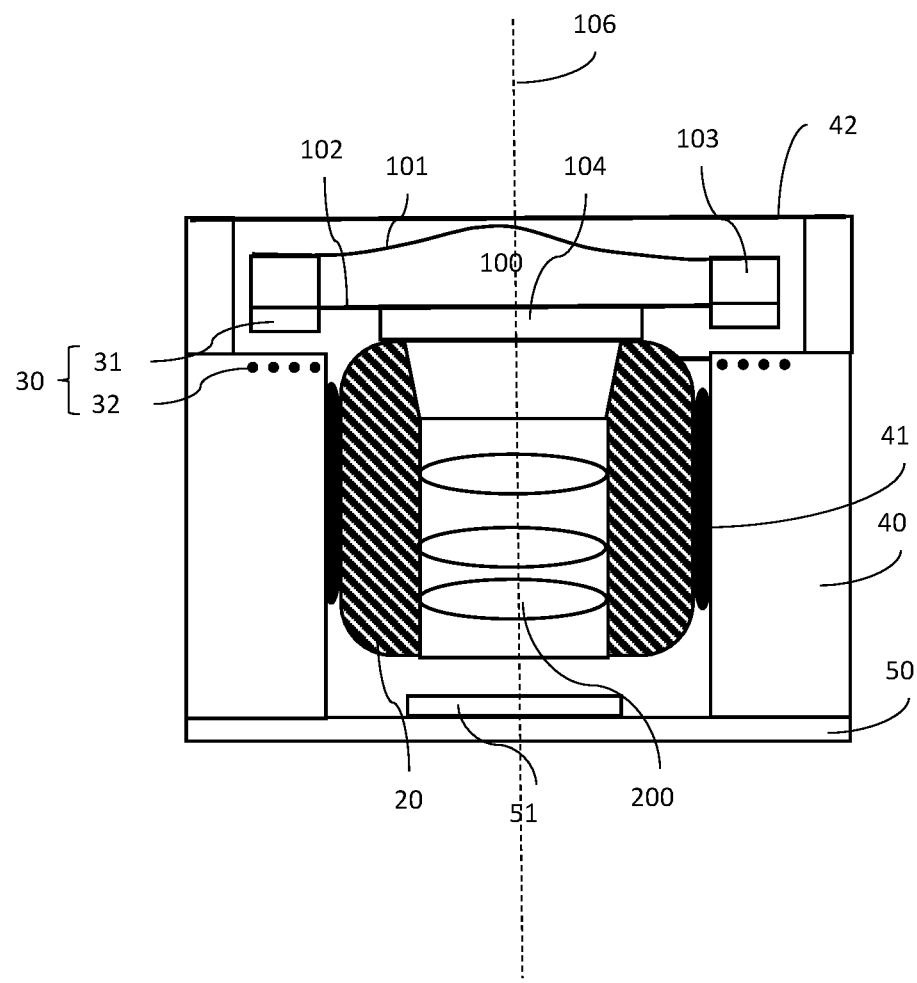
FIG. 13 shows an exemplary embodiment of an objective in a schematic sectional view.

FIG. 13 shows an exemplary embodiment of an objective 1 in a schematic sectional view. The objective 1 comprises the lens barrel 20, the actuator 30 and the tunable lens 10, wherein the tunable lens 10 comprises the primary membrane 101 and the secondary membrane 102 delimiting the liquid volume 100 on opposing sides along an axial direction. The axial direction extends along the optical axis 106.

The tunable lens 10 comprises the window member 104 which is attached to the secondary membrane 102, wherein the secondary membrane 102 connects the window member 104 and the container 103 elastically. The secondary membrane 102 protrudes laterally over the window member 104. The window member 104 is attached to the lens barrel 20. Relative motion of the window member 104 and the container 103 along the axial direction results in a change of an optical property of the tunable lens 10. The window member 104 is fixedly attached to the lens barrel 20.

The actuator 30 is arranged to provide an actuation force 300 along the axial direction, wherein the actuation force 300 acts between the tunable lens 10 and the mounting unit 40. The actuation force 300 results in a relative motion of the window member 104 with respect to the container 103. The actuator 30 is a voice-coil actuator comprising a magnet 31 and a coil 32. The coil 32 is fixedly attached to the mounting unit 40. In particular, the coil 32 is monolithically formed with the mounting unit 40. For example, the mounting unit may be a molded component, which is molded around the coil 32. The coil 32 may be surrounded by the mounting unit 40 completely on all sides. In particular, the conductive structure 61 for contacting the coil electrically is embedded in the mounting unit 40.

The magnet 31 is fixedly attached to the tunable lens 10. The tunable lens protrudes over the lens barrel 20 in lateral directions, perpendicularly with respect to the optical axis. Thus, the coil 32 and the magnet 31 overlap at least partially as seen in a top view along the optical axis 107. When current is applied to the coil 32 Lorenz Force acts between the magnet 31 and the coil 32, which results in the actuation force 300.

The objective comprises a mounting unit 40 and a substrate 50, wherein the lens barrel 20 is attached to the substrate 50 by means of the mounting unit 40. In particular, the lens barrel 20 is attached to the mounting unit 40 by means of an adhesive material 41. The mounting unit 40 is arranged to align the lens barrel 20 with respect to the substrate 50. The substrate comprises an image sensor 51. The image sensor 51 is arranged in the image plane of the objective and the image sensor is arranged to capture an image of the object plane.

The mounting unit 40 protrudes the lens barrel 20 and the tunable lens 10 along the optical axis 106 in both directions. A protection element 42 is arranged on a side of the mounting unit 40 facing away from the substrate 50. The protection element 42 may comprise a transparent material, which is arranged to protect the tunable lens 10. In particular, the protection element may comprise glass or a polymer film.

The invention is not limited to the description based on the embodiments. Rather, the invention encompasses any new feature as well as any combination of features, which includes, in particular, any combination of features in the patent claims, even if that feature or combination itself is not explicitly stated in the patent claims or embodiments.

LIST OF REFERENCE SIGNS

1 Objective
10 Tunable lens
100 Liquid volume
101 Primary membrane
102 Secondary membrane
103 container
104 Window member
105 Aperture
106 Optical axis
20 Lens barrel
21 First face
22 Second face
200 Refractive component
30 Actuator
31 Magnet
310 Inner edge
311 Outer edge
32 Coil
320, 321, 322, 323 Coil portion
321a, 322a, 323a First section
321b, 322b, 323b Second section
33 Piezo element
34 SMA element
341 First SMA section
342 Second SMA section
300 Actuation force
40 Mounting unit
41 Adhesive material
42 Protection element
50 Substrate
51 Image sensor
60 Bonded wire
61 Conductive structure

We claim:

1. Objective comprising a lens barrel, an actuator and a tunable lens, wherein
the tunable lens comprises a primary membrane and a secondary membrane delimiting a liquid volume on opposing sides along an axial direction,
the tunable lens comprises a container delimiting the liquid volume in lateral directions, wherein the lateral directions extend perpendicularly with respect to the axial direction, and the primary membrane and the secondary membrane are attached to opposing sides of the container,
the tunable lens comprises a window member which is attached to the secondary membrane, wherein the secondary membrane connects the window member and the container elastically,
wherein relative motion of the window member and the container along the axial direction results in a change of an optical property of the tunable lens,
the window member or the container is fixedly attached to the lens barrel,
the actuator is arranged to provide an actuation force along the axial direction, wherein the actuation force acts between the tunable lens and the lens barrel, and
the actuation force results in a relative motion of the window member with respect to the container.

2. Objective according to claim 1, wherein
the lens barrel has a cylindrical shape,
the lens barrel has a recess extending completely through the lens barrel from a first face to a second face,
at least one static refractive component is arranged in the recess of the lens barrel, and
the tunable lens is fixedly attached to the first face.

3. Objective according to claim 1 comprising a mounting unit and a substrate, wherein
the lens barrel is attached to the substrate by means of the mounting unit,
a lateral surface of the lens barrel comprises an outside thread and the mounting unit comprises an inside thread, wherein the outside thread is complementary to the inside thread.

4. Objective according to claim 1, wherein the actuator is a voice-coil actuator comprising a magnet and a coil, wherein the coil is fixedly attached to the lens barrel and the magnet is fixedly attached to the tunable lens.

5. Objective according to claim 4, wherein
the magnet is ring-shaped as seen in a top view along the axial direction,
the coil extends along an inner edge and/or along an outer edge of the magnet as seen in a top view.

6. Objective according to claim 5, wherein
the magnet has a chamfered shape, so that a thickness of the magnet at the inner edge is larger than a thickness at the outer edge measured along the axial direction.

7. Objective according to claim 4, wherein
the coil comprises at least three coil portions,
each coil portion comprises a first section and a second section,
the first section extends along the inner edge of the magnet respectively and/or the second section extends along the outer edge of the magnet respectively,
the coil portions are distributed along the perimeter of the ring-shaped magnet, and
a current through the coil portions is individually controllable.

8. Objective according to claim 1, wherein the actuator comprises a piezo element, wherein the piezo element is attached to the lens barrel and the tunable lens.

9. Objective according to claim 1, wherein the actuator comprises a SMA element, wherein the SMA element is attached to the tunable lens and to the mounting unit and/or the lens barrel.

10. Objective according to claim 9, wherein the SMA element comprises first SMA sections generating a force in a first direction and second SMA sections generating a force in a second direction, wherein the first direction and the second direction are opposed with respect to each other along the axial direction.

11. Objective according to claim 1 wherein
the actuator is electrically connected to the substrate by means of bonded wires, wherein the bonded wires are connected to the lens barrel, the mounting unit and/or the substrate.

12. Objective according to claim 1 wherein
the actuator is electrically connected to the substrate by means of a molded conductive structure which is integrally formed with the mounting unit, and/or the lens barrel.

* * * * *